UNITED STATES PATENT OFFICE.

JOHN W. MAXWELL, OF WILLIAMSPORT, PENNSYLVANIA.

METHOD OF MANUFACTURING STEEL.

No. 900,564.  Specification of Letters Patent.  Patented Oct. 6, 1908.

Application filed February 20, 1906. Serial No. 302,124.

*To all whom it may concern:*

Be it known that I, JOHN W. MAXWELL, a citizen of the United States of America, residing at Williamsport, in the county of Lycoming and State of Pennsylvania, have invented certain new and useful Improvements in Methods of Manufacturing Steel, of which the following is a specification, reference being had therein to the accompanying drawing.

This invention has relation to a method of manufacturing steel and has for its object the provision of a novel method of manufacturing steel by a basic open-hearth process.
In the ordinary open-hearth process a batch of metal composed of pig iron and scrap iron and steel usually in the proportion of about 75% of pig iron to 25% of scrap iron or steel are placed in an open-hearth furnace together with limestone and melted, the usual method being to charge the furnace first with limestone, then with the pig iron and finally with the scrap iron or steel. After the materials are melted the charge is refined by adding more limestone and some form of iron oxid, usually iron ore, fluor spar and other agents and when the desired state of purity has been reached if low carbon steel is desired, the batch is tapped out, but if high carbon steel is desired it is secured by the addition of ferro manganese or spiegeleisen or else pure pig iron to obtain the desired percentage of carbon.

In my improved method the pig-iron in small quantities and preferably a neutral pig-iron, that is a pig-iron low in silicon and phosphorus, together with limestone, lime or other suitable material containing calcium are first charged in an open-hearth furnace of the ordinary or any suitable type. A quantity of carbonaceous material preferably in the form of charcoal, coal or coke, is then quickly spread over the charge of pig-iron and limestone, the quantity of such carbonaceous material employed being sufficient to give the required or a greater percentage of carbon than is necessary to secure the required percentage of carbon in the finished stock. This carbonaceous material is then quickly covered by the scrap iron or steel to be used, so as to protect it from exposure to the free oxygen in the flame in the furnace, as my object in using a carbonaceous material in this way is not to secure heat for melting the charge but solely to add carbon to the scrap iron or steel used.

In ordinary practice, I do not add all the charcoal or other carbonaceous material and all the scrap iron or steel to the charge at one time, but add a portion of the carbonaceous material and cover the same with a portion of the scrap iron or steel and then as the charge melts, add more of the carbonaceous material and cover it with more of the scrap iron or steel and carry the process along in this manner until all the required carbonaceous material and scrap iron or steel have been charged and melted down. Much however, depends on the condition of the hearth and the working of the furnace and it is sometimes found desirable to charge a part of the scrap iron or steel first, then the limestone, then more of the scrap iron or steel, then the charcoal or coke, and then cover the charcoal or coke with the remainder of the scrap iron or steel, the essential point to be kept in view being to so arrange the materials as to bring the carbonaceous material into close contact with the scrap iron or steel and at the same time to protect it from combustion by the free oxygen in the flame in the furnace.

When thus treated, a charge of scrap iron or steel absorbs or takes up enough carbon during the melting period to not only lower their melting point enough so that they are readily melted at the ordinary temperature maintained in an open hearth furnace but also to produce steel of very high carbon from very pure materials if so desired. After the charge has been melted down as above described, the refining of the bath is then proceeded with in the ordinary manner, and after the required refining has been accomplished and the carbon reduced to the desired percentage the bath is tapped out of the furnace, the usual final addition of ferromanganese, ferro-silicon, aluminum, etc., and such other material and materials as are usually employed to produce alloys where alloys are desired, being added either in the furnace or in the ladle.

Heretofore it has been considered impracticable to melt a charge of pure wrought iron in an open hearth furnace without the addition of pig iron but only by my improved method this is easily accomplished and heats of steel of any carbon desired from very soft to extremely hard are readily produced from charges of iron and steel scrap with the use of pig iron. Steel of very fine quality may thus be produced with great uniformity from very cheap materials.

I claim:

1. The method of manufacturing steel consisting in charging an open hearth furnace with a calcareous material such as limestone or lime, a carbonaceous material or materials, and scrap iron or steel, the whole being charged in such a manner as to bring the scrap iron or steel into intimate contact with the carbonaceous material or materials and at the same time to protect the carbonaceous material or materials from oxidation by the free oxygen in the furnace, then melting the charge and completing the refining thereof in the usual manner, and finally removing it from the furnace.

2. The method of manufacturing steel, consisting in charging an open hearth furnace with pig iron and a calcareous material such as limestone or lime, then a carbonaceous material or materials, and finally covering the same with wrought iron or steel and then melting and refining the charge in the usual manner and tapping from the furnace.

3. The method of manufacturing steel, consisting in placing a charge of pig iron and material containing calcium in an open hearth furnace, then placing on this charge carbonaceous material covered by scrap iron or steel, and then melting the charge.

In testimony whereof I affix my signature in the presence of two witnesses.

JOHN W. MAXWELL.

Witnesses:
J. B. CONNOLLY,
CHARLES LOWELL HOWARD.